(12) United States Patent
Chen et al.

(10) Patent No.: US 11,057,567 B2
(45) Date of Patent: *Jul. 6, 2021

(54) ANTI-SHAKE METHOD AND APPARATUS FOR PANORAMIC VIDEO, AND PORTABLE TERMINAL

(71) Applicant: ARASHI VISION INC., Shenzhen (CN)

(72) Inventors: Cong Chen, Shenzhen (CN); Jinlin Cai, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/759,315

(22) PCT Filed: Oct. 16, 2018

(86) PCT No.: PCT/CN2018/110467
§ 371 (c)(1),
(2) Date: Apr. 24, 2020

(87) PCT Pub. No.: WO2019/080748
PCT Pub. Date: May 2, 2019

(65) Prior Publication Data
US 2020/0314340 A1    Oct. 1, 2020

(30) Foreign Application Priority Data

Oct. 25, 2017  (CN) .......................... 201711015180.0

(51) Int. Cl.
*H04N 5/232*  (2006.01)
*G01P 3/22*  (2006.01)
*G01P 15/18*  (2013.01)

(52) U.S. Cl.
CPC .......... *H04N 5/23258* (2013.01); *G01P 3/22* (2013.01); *G01P 15/18* (2013.01); *H04N 5/23238* (2013.01)

(58) Field of Classification Search
CPC ........ H04N 5/23258; G01P 15/18; G01P 3/22
See application file for complete search history.

(56) References Cited

U.S. PATENT DOCUMENTS

| | | |
|---|---|---|
| 5,051,751 A | 9/1991 | Gray |
| 2019/0132516 A1* | 5/2019 | Li .......................... H04N 5/232 |

FOREIGN PATENT DOCUMENTS

| | | |
|---|---|---|
| CN | 103077509 A | 5/2013 |
| CN | 104331902 A | 2/2015 |

(Continued)

OTHER PUBLICATIONS

Michael Fieseler, Xiaoyi Jiang, "Registration of Depth and Video Data in Depth Image Based Rendering", 2009, 4 Pages, IEEE.

(Continued)

*Primary Examiner* — Girumsew Wendmagegn
(74) *Attorney, Agent, or Firm* — Cheng-Ju Chiang (57) ABSTRACT

The present invention is applicable to the field of videos. Provided are an anti-shake method and apparatus for a panoramic video, and a portable terminal. The method comprises: acquiring, in real time, a current state timestamp, an accelerometer numerical value and an angular velocity numerical value of a gyroscope in a portable terminal; performing estimation using extended Kalman filtering combined with the accelerometer numerical value and the angular velocity numerical value to obtain an amount of rotation of the portable terminal to a world coordinate system; synchronizing the timestamp of the gyroscope with a timestamp of a panoramic video frame; performing quaternion interpolation on the state of the gyroscope to acquire a rotation matrix corresponding to the panoramic video frame;

(Continued)

and rotating a panoramic image according to the current rotation matrix to generate a stable video frame.

18 Claims, 3 Drawing Sheets

(56) References Cited

FOREIGN PATENT DOCUMENTS

| CN | 107040694 A | * | 8/2017 | ......... H04N 5/23258 |
|---|---|---|---|---|
| CN | 107040694 A | | 8/2017 | |
| CN | 107801014 A | | 3/2018 | |

OTHER PUBLICATIONS

Hongqian Chen, "Computer Graphics and Crowd Simulation", pp. 101-104, China Machine Press.

* cited by examiner

FIG. 4 though the handheld panoramic camera is used, the shaking of the picture can be avoided, and the VR motion sickness can be alleviated.

ANTI-SHAKE METHOD AND APPARATUS FOR PANORAMIC VIDEO, AND PORTABLE TERMINAL

CROSS REFERENCE TO RELATED APPLICATIONS

The present application is a 35 U.S.C. § 371 National Phase conversion of International (PCT) Patent Application No. PCT/CN2018/110467, filed on Oct. 16, 2018, which claims priority of Chinese Patent Application No. 201711015180.0, filed on Oct. 25, 2017, the disclosure of which is incorporated by reference herein. The PCT International Patent Application was filed and published in Chinese.

FIELD OF THE INVENTION

The present invention relates generally to the field of videos, and more specifically to an anti-shake method and apparatus for a panoramic video, and a portable terminal.

BACKGROUND OF THE INVENTION

The panoramic video provided by the existing technology, when worn with VR glasses, will make people feel sick and dizzy, and VR motion sickness is a problem that has not been solved very well. In addition to the failure to make a breakthrough in hardware, the software failure is also the reason. Especially for VR panoramic video, if a handheld panoramic camera is used, the shaking of the picture will further accelerate the generation of VR motion sickness.

SUMMARY OF THE INVENTION

Technical Problem

The object of the present invention is to provide an anti-shake method and apparatus for a panoramic video, computer-readable storage medium and a portable terminal, aiming to solve the problem that the shaking of the picture will further accelerate the generation of VR motion sickness.

Technical Solution

According to a first aspect, the present invention provides an anti-shake method for a panoramic video, comprising:

acquiring, in real time, a current state timestamp, an accelerometer data and an angular velocity of a gyroscope in a portable terminal;

estimating a rotation from the portable terminal to a world coordinate system using Extended Kalman Filtering combined with both the accelerometer data and the angular velocity;

synchronizing the timestamp of the gyroscope with a timestamp of a panoramic video frame;

performing quaternion interpolation in a rotation from the portable terminal to a world coordinate system to obtain a rotation matrix corresponding to the panoramic video frame; and rotating a panoramic image according to the current rotation matrix to generate a stable video frame.

According to a second aspect, the present invention provides an anti-shake apparatus for a panoramic video, comprising:

acquiring unit, for acquiring, in real time, a current state timestamp, an accelerometer data and an angular velocity of a gyroscope in a portable terminal;

an estimation unit, for estimating a rotation from the portable terminal to a world coordinate system using Extended Kalman Filtering combined with both the accelerometer data and the angular velocity;

a synchronizing unit, for synchronizing the timestamp of the gyroscope with a timestamp of a panoramic video frame;

an interpolation unit, for performing quaternion interpolation in a rotation from the portable terminal to a world coordinate system to obtain a rotation matrix corresponding to the panoramic video frame; and a rotation unit, for rotating a panoramic image according to the current rotation matrix to generate a stable video frame.

According to a third aspect, the present invention provides a computer-readable medium that stores a computer program, the computer program is to be executed by a processor to perform steps of the anti-shake method for a panoramic video described above.

According to a fourth aspect, the present invention provides a portable terminal, comprising:

one or more processors;

a memory; and one or more computer programs, wherein the one or more computer programs are stored in the memory and are configured to be executed by the one or more processors to perform steps of the anti-shake method for a panoramic video described above.

Advantages

By means of performing quaternion interpolation in a rotation from the portable terminal to a world coordinate system to obtain a rotation matrix corresponding to the panoramic video frame in the present invention, a more accurate rotation matrix can be obtained, and a panoramic image is then rotated according to the current rotation matrix to generate a stable video frame. Therefore, a shaky video frame can finally be stabilized, VR motion sickness can be alleviated, and strong robustness for a loud-noise scene and most motion scenes is provided.

DETAILED DESCRIPTION OF THE INVENTION

The foregoing objects, technical solution and advantages of the invention will be much clearer from the following detail description taken with the accompanying drawings and embodiments. It should be understood that the specific embodiments described herein are only used to explain the present invention and are not intended to limit the present invention.

In order to explain the technical solution of the present invention, the following will be described by specific embodiments.

First Embodiment

Figure 1:
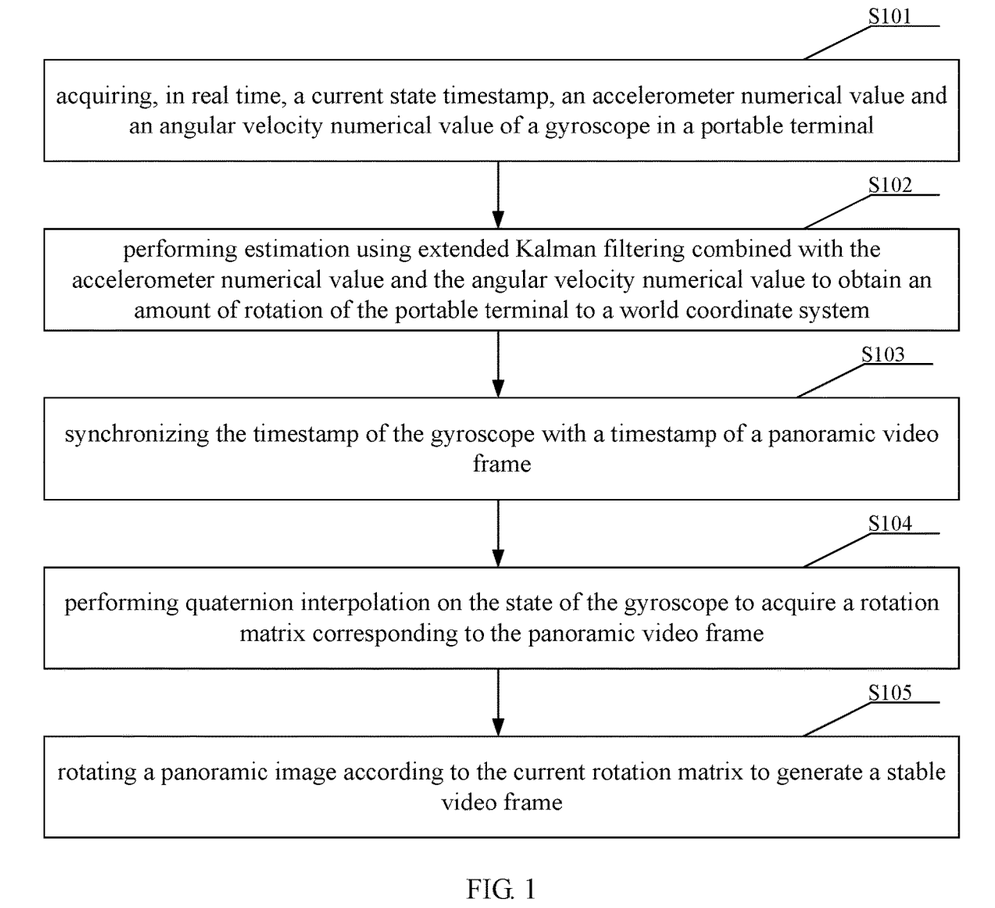
FIG. 1 is a flow diagram of an anti-shake method for a panoramic video in accordance with a first embodiment of the present invention.

Referring to FIG. 1, an anti-shake method for a panoramic video in accordance with the first embodiment of the present invention comprises the following steps.

S101, acquiring, in real time, a current state timestamp, an accelerometer data and an angular velocity of a gyroscope in a portable terminal.

In the first embodiment of the present invention,
acquiring, in real time, an accelerometer data of the gyroscope in the portable terminal, may specifically be: reading 3-axis accelerometer data using a gravity sensor;
acquiring, in real time, an angular velocity of the gyroscope in the portable terminal, may specifically be: reading 3-axes angular velocities using an angular velocity sensor.

In the first embodiment of the present invention, after S101, the method may further comprise a step of:
reducing noise from the accelerometer data using a low-pass filtering, which can further comprise steps of:
reducing noise from the accelerometer data using a low-pass filtering through the formula $d'_i = \alpha \cdot d_i + (1-\alpha) \cdot R_i \cdot d'_{i-1}$, where $d'_i$ represents the accelerometer data after low-pass filtering at time i, $d_i$ represents the accelerometer data at time i, and $R_i$ is a relative rotation of the i frame video of the gyroscope; $R_i = \exp[-\omega_i \cdot \Delta t]_x$, where $\omega_i$ represents an angular velocity at time i, $d'_{i-1}$ represents the accelerometer data after low-pass filtering at time i-1, and $\alpha$ represents a smoothing factor, $$\alpha = \frac{\Delta t}{Rc + \Delta t},$$

$$Rc = \frac{1}{2\pi f_c},$$

where $f_c$ represents a cut-off frequency for a low-pass filtering, Rc represents a time constant, and $\Delta t$ represents a sampling time interval of the gyroscope.

S102, estimating a rotation from the portable terminal to a world coordinate system using EKF (Extended Kalman Filtering) combined with both the accelerometer data and the angular velocity.

Extended Kalman Filtering is to linearize a nonlinear system and then perform Kalman filtering. Kalman filter is a highly efficient recursive filter that can estimate a state of a dynamic system from a series of measurements that do not completely contain noise.

Figure 2:
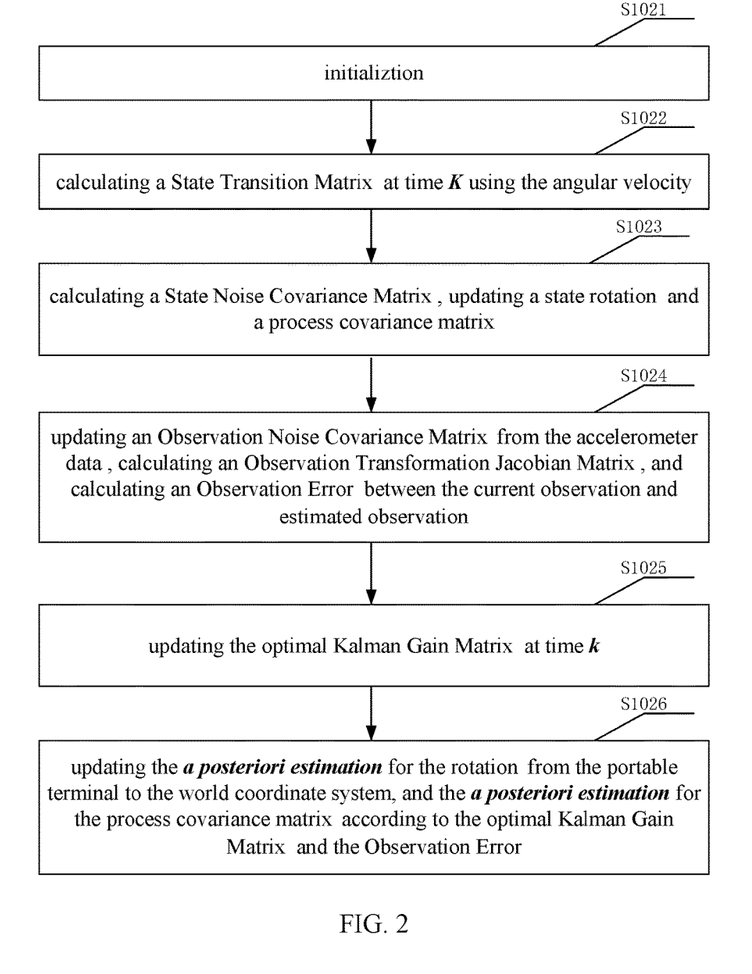
FIG. 2 is a flow diagram of S102 of the anti-shake method for a panoramic video in accordance with a first embodiment of the present invention.

Referring to FIG. 2, in the first embodiment of the present invention, S102 may specifically comprise steps of:

S1021, calculating an initial-state rotation $q_0^+$ and an initial process covariance matrix $P_0^+$, $$q_0^+ = \exp\left[-\frac{d_0 \times g}{|d_0 \times g|} * a\cos(d_0 \cdot g)\right]_x,$$

where, $d_0$ is a measured initial accelerometer data, g is the gravity vector of the world coordinate system; and $$P_0^+ = \begin{bmatrix} 25.0 & 0 & 0 \\ 0 & 25.0 & 0 \\ 0 & 0 & 25.0 \end{bmatrix};$$

S1022, calculating a State Transition Matrix $\Phi(\omega_k)$ at time K using the angular velocity $\omega_k$;
$\Phi(\omega_k) = \exp(-[\omega_k \cdot \Delta t]_x)$, where, $\omega_k$ is an angular velocity at time K, $\Delta t$ represents the sampling time interval of the gyroscope;

S1023, calculating a State Noise Covariance Matrix $Q_k$, updating an a priori estimate for a state rotation $q_k^-$ and an a priori estimate for a process covariance matrix $p_k^-$;

$$Q_k = \begin{bmatrix} \Delta t^2 & & \\ & \Delta t^2 & \\ & & \Delta t^2 \end{bmatrix},$$

where $Q_k$ is a State Noise Covariance Matrix;
$q_k^- = \Phi(\omega_k) * q_{k-1}^+$, where, $q_{k-1}^+$ is an a posteriori estimation for a state rotation at time K-1;
$P_k^- = q_k^- \cdot P_{k-1}^+ \cdot q_k^- + Q_k$, where, $P_{k-1}^+$ is an a posteriori estimation for a process covariance matrix at time K-1;

S1024, updating an Observation Noise Covariance Matrix $V_k$ from the accelerometer data $d_k$, calculating an Observation Transformation Jacobian Matrix $H_k$, and calculating an Observation Error $e_k$ between the current observation and estimated observation;

$$V_k = \begin{bmatrix} \delta_k^2 & & \\ & \delta_k^2 & \\ & & \delta_k^2 \end{bmatrix},$$

where $\delta_k = \delta_k^{var} + \delta_k^{mean}$, $\delta_k^{var} = \alpha \||d_k| - |d_{k-1}|\| + (1-\alpha)\delta_{k-1}^{var}$, $$\delta_k^{mean} = \beta\left||d_k| + \frac{1}{|d_k|} - 2\right|,$$

$\alpha$ is a smoothing factor for an acceleration change, and $\beta$ is an impact factor for an acceleration module;

$$H_k = \left.\frac{\partial h}{\partial q}\right|_{q_k^-},$$

where, h is an observation function, $h(q,v) = q \cdot g + I_k$, g is the gravity vector of the world coordinate system, q is a state, that is, a rotation from the world coordinate system to the gyroscope coordinate system; $I_k$ is a measurement noise;

$e_k = d_k \times h(q_k^-, 0)$;

S1025, updating the optimal Kalman Gain Matrix $K_k$ at time k;

$K_k = P_k^- \cdot H_k^T (H_k \cdot P_k^- \cdot H_k^T + V_k)^{-1}$; and

S1026, updating the a posteriori estimation for the rotation $q_k^+$ from the portable terminal to the world coordinate system, and the a posteriori estimation for the process covariance matrix $p_k^+$ according to the optimal Kalman Gain Matrix $K_k$ and the Observation Error $e_k$, $$q_k^+ = \exp([K_k \cdot e_k]_x) \cdot q_k^-,$$

$$P_k^+ = \exp([K_k \cdot e_k]_x) \cdot P_k^- \cdot \exp([K_k \cdot e_k]_x).$$

S103, synchronizing the timestamp of the gyroscope with a timestamp of a panoramic video frame.

In accordance with the first embodiment of the present invention, S103 can be:

synchronizing the timestamp of the gyroscope with a timestamp of a panoramic video frame, so that $t_k \geq t_j > t_{k-1}$, where $t_j$ is the timestamp of a panoramic video frame, $t_k$ is the timestamp of the K frame of the gyroscope, and $t_{k-1}$ is the timestamp of the K−1 frame of the gyroscope.

S104, performing quaternion interpolation in a rotation from the portable terminal to a world coordinate system to obtain a rotation matrix corresponding to the panoramic video frame.

In the first embodiment of the present invention, S104 may specifically comprise steps of:

calculating a relative rotation of adjacent timestamps of the gyroscope, $r_k = q_k^+ q_{k-1}^{+}$, where, $r_k$ is the relative rotation at time K, $q_k^+$ and $q_{k-1}^+$ are respectively a posteriori estimation for the state rotation at time K and K−1, that is, the rotation from the world coordinate system to the gyroscope coordinate system;

performing quaternion interpolation to obtain a relative rotation from the panoramic video frame to the K frame, $R_j = \gamma \cdot I + (1-\gamma) \cdot r_k$, where, $R_j$ is the relative rotation of the K frame, $$\gamma = \frac{t_j - t_{k-1}}{t_k - t_{k-1}};$$

and calculating a rotation matrix of the j-frame video in the panoramic video frame: $Q_j = R_j^{-1} q_k^+$.

S105, rotating a panoramic image according to the current rotation matrix to generate a stable video frame.

In the first embodiment of the present invention, S105 may specifically comprise steps of:

mapping grid points on the 2D image with latitude and longitude to a spherical coordinate; and traversing all points on the unit sphere, using the current rotation matrix to rotate all points on the unit sphere, and generate a stable video frame;

where, using the current rotation matrix to rotate all points on the unit sphere, which can use the following formula:

$$\begin{bmatrix} x_{new} \\ y_{new} \\ z_{new} \end{bmatrix} = Q_j \begin{bmatrix} x \\ y \\ z \end{bmatrix} + t,$$

where $[x, y, z]^T$ represents the spherical coordinate before a unit circle rotates, $[x_{new}, y_{new}, z_{new}]^T$ represents the spherical coordinates after rotation, $Q_j$ represents the current rotation matrix, and t represents a displacement vector, $t=[0,0,0]^T$.

Second Embodiment

Figure 3:
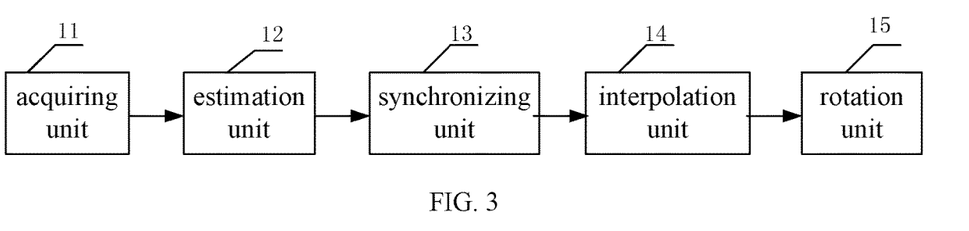
FIG. 3 is a schematic diagram of an anti-shake apparatus for a panoramic video in accordance with a second embodiment of the present invention.

Referring to FIG. 3, in accordance with a second embodiment of the present invention, an anti-shake apparatus for a panoramic video, comprises:

an acquiring unit 11, for acquiring, in real time, a current state timestamp, an accelerometer data and an angular velocity of a gyroscope in a portable terminal;

an estimation unit 12, for estimating a rotation from the portable terminal to a world coordinate system using Extended Kalman Filtering combined with both the accelerometer data and the angular velocity;

a synchronizing unit 13, for synchronizing the timestamp of the gyroscope with a timestamp of a panoramic video frame;

an interpolation unit 14, for performing quaternion interpolation in a rotation from the portable terminal to a world coordinate system to obtain a rotation matrix corresponding to the panoramic video frame; and a rotation unit 15, for rotating a panoramic image according to the current rotation matrix to generate a stable video frame.

An anti-shake apparatus for a panoramic video provided in the second embodiment of the present invention and an anti-shake method for a panoramic video provided in the first embodiment belong to the same idea. For the detail implementation process, please refer to the full text of the specification, which will not be repeated here.

Third Embodiment

The third embodiment of the present invention provides a computer-readable medium that stores a computer program, the computer program is to be executed by a processor to perform steps of the anti-shake method for a panoramic video provided in the first embodiment of the present invention.

Fourth Embodiment

Figure 4:
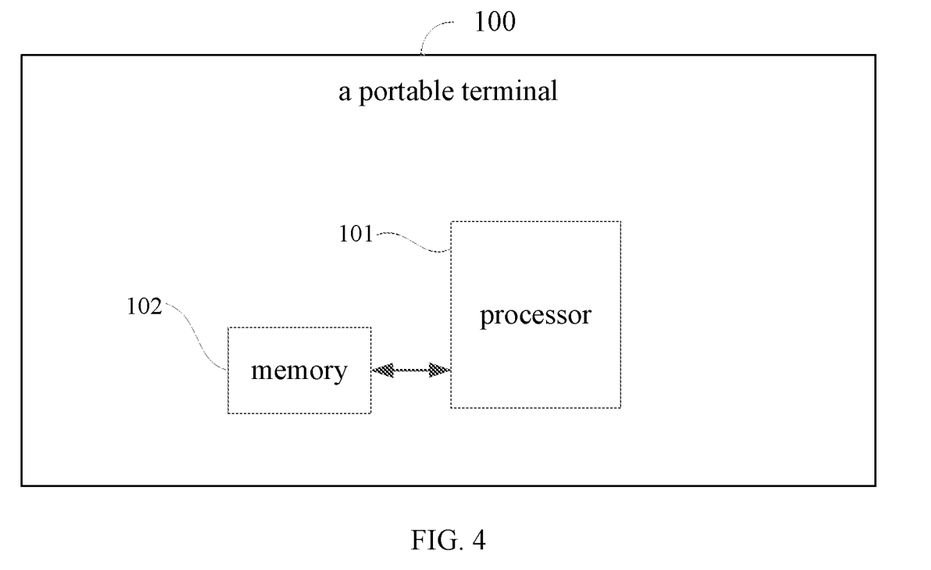
FIG. 4 is a schematic diagram of a portable terminal in accordance with a third embodiment of the present invention.

FIG. 4 shows a block diagram of a portable terminal provided in the fourth Embodiment of the present invention. A portable terminal 100 comprises: one or more processors 101, a memory 102, and one or more computer programs. The one or more processors 101 and the memory 102 are connected by a bus. The one or more computer programs are stored in the memory 102, and are configured to be executed by the one or more processors 101 to perform steps of the anti-shake method for a panoramic video provided in the first embodiment of the present invention.

In accordance with the embodiment of the present invention, by means of performing quaternion interpolation in a rotation from the portable terminal to a world coordinate system to obtain a rotation matrix corresponding to the panoramic video frame, a more accurate rotation matrix can be obtained. A panoramic image is then rotated according to the current rotation matrix to generate a stable video frame. Therefore, a shaky video frame can finally be stabilized, VR motion sickness can be alleviated, and strong robustness for a loud-noise scene and most motion scenes is provided.

A person of ordinary skill in the art may understand that all or part of the steps in the method of the above embodiments can be completed by instructing relevant hardware through a program. The program can be stored in a computer-readable storage medium, and the storage Media can be, such as ROM/RAM, magnetic disk, optical disk, etc.

The above are only preferred embodiments of the present invention and are not intended to limit the present invention. Any modification, equivalents replacements and improvements made within the spirit and principle of the present invention should be included within the scope of the present invention.

What is claimed is:

1. An anti-shake method for a panoramic video, comprising steps of:

acquiring, in real time, a current state timestamp, an accelerometer data and an angular velocity of a gyroscope in a portable terminal;

estimating a rotation from the portable terminal to a world coordinate system using Extended Kalman Filtering combined with both the accelerometer data and the angular velocity;

synchronizing the timestamp of the gyroscope with a timestamp of a panoramic video frame;

performing quaternion interpolation in a rotation from the portable terminal to a world coordinate system to obtain a rotation matrix corresponding to the panoramic video frame; and rotating a panoramic image according to the current rotation matrix to generate a stable video frame;

wherein the step of estimating a rotation from the portable terminal to a world coordinate system using Extended Kalman Filtering combined with both the accelerometer data and the angular velocity, specifically comprises steps of:

S1021, calculating an initial-state rotation $q_0^+$ and an initial process covariance matrix $$P_0^+, q_0^+ = \exp\left[-\frac{d_0 \times g}{|d_0 \times g|} * a\cos(d_0 \cdot g)\right]_x,$$

where, $d_0$ is a measured initial accelerometer data, g is the gravity vector of the world coordinate system; an initial process covariance matrix $$P_0^+ = \begin{bmatrix} 25.0 & 0 & 0 \\ 0 & 25.0 & 0 \\ 0 & 0 & 25.0 \end{bmatrix};$$

S1022, calculating a State Transition Matrix $\Phi(\omega_k)$ at time K using the angular velocity $\omega_k$;

$\Phi(\omega_k) = \exp(-[\omega_k \cdot \Delta t]_x)$, where, $\omega_k$ is an angular velocity at time K, $\Delta t$ represents a sampling time interval of the gyroscope;

S1023, calculating a State Noise Covariance Matrix $Q_k$, updating an a priori estimate for a state rotation $q_k^-$ and an a priori estimate for a process covariance matrix $p_k^-$;

$$Q_k = \begin{bmatrix} \Delta t^2 & & \\ & \Delta t^2 & \\ & & \Delta t^2 \end{bmatrix},$$

where $Q_k$ is a State Noise Covariance Matrix;

$q_k^- = \Phi(\omega_k) * q_{k-1}^+$, where, $q_{k-1}^+$, is an a posteriori estimation for a state rotation at time K−1;

$P_k^- = q_k^- \cdot P_{k-1}^+ \cdot q_k^- + Q_k$, where, $P_{k-1}^+$ is an a posteriori estimation for a process covariance matrix at time K−1;

S1024, updating an Observation Noise Covariance Matrix $V_k$ from the accelerometer data $d_k$, calculating an Observation Transformation Jacobian Matrix $H_k$, and calculating an Observation Error $e_k$ between the current observation and estimated observation;

$$V_k = \begin{bmatrix} \delta_k^2 & & \\ & \delta_k^2 & \\ & & \delta_k^2 \end{bmatrix},$$

where, $\delta_k = \delta_k^{var} + \delta_k^{mean}$, $\delta_k^{var} = \alpha \|d_k\| - \|d_{k-1}\| + (1-\alpha)\delta_{k-1}^{var}$, $$\delta_k^{mean} = \beta \left| |d_k| + \frac{1}{|d_k|} - 2 \right|,$$

α is a smoothing factor for an acceleration change, and β is an impact factor for an acceleration module;

$$H_k = \frac{\partial h}{\partial q}\bigg|_{q_k^-},$$

where, h is an observation function, $h(q,v) = q \cdot g + I_k$, g is the gravity vector of the world coordinate system, q is a state rotation, that is, a rotation from the world coordinate system to the gyroscope coordinate system; $I_k$ is a measurement noise;

$e_k = d_k \times h(q_k^-, 0);$

S1025, updating an optimal Kalman Gain Matrix $K_k$ at time k;

$K_k = P_k^- \cdot H_k^T (H_k \cdot P_k^- \cdot H_k^T + V_k)^{-1}$; and

S1026, updating the a posteriori estimation for a rotation $q_k^+$ from the portable terminal to the world coordinate system, and the a posteriori estimation for the process covariance matrix $p_k^+$ according to the optimal Kalman Gain Matrix $K_k$ and the Observation Error $e_k$;

$q_k^+ = \exp([K_k \cdot e_k]_x) \cdot q_k^-,$ $P_k^+ = \exp([K_k \cdot e_k]_x) \cdot P_k^- \cdot \exp([K_k \cdot e_k]_x).$ 2. The method of claim 1, wherein the step of acquiring, in real time, an accelerometer data of the gyroscope in the portable terminal, is: reading 3-axis accelerometer data using a gravity sensor; and the step of acquiring, in real time, an angular velocity of the gyroscope in the portable terminal, is: reading 3-axes angular velocities using an angular velocity sensor.

3. The method of claim 1, after the step of acquiring, in real time, a current state timestamp, an accelerometer data and an angular velocity of a gyroscope in a portable terminal, further comprising a step of:

reducing noise from the accelerometer data using a low-pass filtering, which further comprises:

reducing noise from the accelerometer data using a low-pass filtering through Formula $d'_i = \alpha \cdot d_i + (1-\alpha) \cdot R_i \cdot d'_{i-1}$, where $d'_i$ represents the accelerometer data after low-pass filtering at time i, $d_i$ represents the accelerometer data at time i, and $R_i$ is a relative rotation of the i frame video of the gyroscope; $R_i = \exp[-\omega_i \cdot \Delta t]_x$, where $\omega_i$ represents the angular velocity at time i, $d'_{i-1}$ represents the accelerometer data after low-pass filtering at time i−1, and α represents a smoothing factor, $$\alpha = \frac{\Delta t}{Rc + \Delta t},$$

$$Rc = \frac{1}{2\pi f_c},$$

where $f_c$ represents a cut-off frequency for a low-pass filtering, Rc represents a time constant, and $\Delta t$ represents a sampling time interval of the gyroscope.

4. The method of claim 1, wherein the step of synchronizing the timestamp of the gyroscope with a timestamp of a panoramic video frame, is:

synchronizing the timestamp of the gyroscope with the timestamp of a panoramic video frame, so that $t_k \geq t_j > t_{k-1}$, where $t_j$ is the timestamp of a panoramic video frame, $t_k$ is the timestamp of the K frame of the gyroscope, and $t_{k-1}$ is the timestamp of the K-1 frame of the gyroscope.

5. The method of claim 4, wherein the step of performing quaternion interpolation in a rotation from the portable terminal to a world coordinate system to obtain a rotation matrix corresponding to the panoramic video frame, comprises steps of:

calculating a relative rotation of adjacent timestamps of the gyroscope, $r_k = q_k^+ q_{k-1}^+$, where, $r_k$ is a relative rotation at time K, $q_k^+$ and $q_{k-1}^+$ are respectively a posteriori estimation for the state rotation at time K and K-1, that is, the rotation from the world coordinate system to the gyroscope coordinate system;

performing quaternion interpolation to obtain a relative rotation from the panoramic video frame to the K frame of the gyroscope, $R_j = \gamma \cdot I + (1-\gamma) \cdot r_k$, where, $R_j$ is the relative rotation of the K frame, $$\gamma = \frac{t_j - t_{k-1}}{t_k - t_{k-1}};$$

and calculating a rotation matrix of the j-frame video in the panoramic video frame, $Q_j = R_j^{-1} q_k^+$.

6. The method of claim 5, wherein the step of rotating a panoramic image according to the current rotation matrix to generate a stable video frame, further comprises steps of:

mapping grid points on a 2D image with latitude and longitude to a spherical coordinate; and traversing all points on a unit sphere, using the current rotation matrix to rotate all points on the unit sphere, and generate a stable video frame;

where, the step of using the current rotation matrix to rotate all points on the unit sphere, can use Formula:

$$\begin{bmatrix} x_{new} \\ y_{new} \\ z_{new} \end{bmatrix} = Q_j \begin{bmatrix} x \\ y \\ z \end{bmatrix} + t,$$

where $[x, y, z]^T$ represents the spherical coordinate before a unit circle rotates, $[x_{new}, y_{new}, z_{new}]^T$ represents the spherical coordinates after rotation, $Q_j$ represents the current rotation matrix, and t represents a displacement vector, $t=[0,0,0]^T$.

7. A non-transitory computer-readable medium having stored thereon, a set of computer-executable instructions for causing a processor to perform steps comprising:

acquiring, in real time, a current state timestamp, an accelerometer data and an angular velocity of a gyroscope in a portable terminal;

estimating a rotation from the portable terminal to a world coordinate system using Extended Kalman Filtering combined with both the accelerometer data and the angular velocity;

synchronizing the timestamp of the gyroscope with a timestamp of a panoramic video frame;

performing quaternion interpolation in a rotation from the portable terminal to a world coordinate system to obtain a rotation matrix corresponding to the panoramic video frame; and rotating a panoramic image according to the current rotation matrix to generate a stable video frame;

wherein the step of estimating a rotation from the portable terminal to a world coordinate system using Extended Kalman Filtering combined with both the accelerometer data and the angular velocity, specifically comprises steps of:

S1021, calculating an initial-state rotation $q_0^+$ and an initial process covariance matrix $$P_0^+, q_0^+ = \exp\left[-\frac{d_0 \times g}{|d_0 \times g|} * a\cos(d_0 \cdot g)\right]_{\times},$$

where, $d_0$ is a measured initial accelerometer data, g is the gravity vector of the world coordinate system; an initial process covariance matrix $$P_0^+ = \begin{bmatrix} 25.0 & 0 & 0 \\ 0 & 25.0 & 0 \\ 0 & 0 & 25.0 \end{bmatrix};$$

S1022, calculating a State Transition Matrix $\Phi(\omega_k)$ at time K using the angular velocity $\omega_k$;

$\Phi(\omega_k) = \exp(-[\omega_k \cdot \Delta t]_x)$, where, $\omega_k$ is an angular velocity at time K, $\Delta t$ represents a sampling time interval of the gyroscope;

S1023, calculating a State Noise Covariance Matrix $Q_k$, updating an a priori estimate for a state rotation $q_k^-$ and an a priori estimate for a process covariance matrix $p_k^-$;

$$Q_k = \begin{bmatrix} \Delta t^2 & & \\ & \Delta t^2 & \\ & & \Delta t^2 \end{bmatrix},$$

where $Q_k$ is a State Noise Covariance Matrix;

$q_k^- = \Phi(\omega_k) * q_{k-1}^+$, where, $q_{k-1}^+$ is an a posteriori estimation for a state rotation at time K-1;

$P_k^- = q_k^- \cdot P_{k-1}^+ \cdot q_k^- + Q_k$, where, $P_{k-1}^+$ is an a posteriori estimation for a process covariance matrix at time K-1;

S1024, updating an Observation Noise Covariance Matrix $V_k$ from the accelerometer data $d_k$, calculating an Observation Transformation Jacobian Matrix $H_k$, and calculating an Observation Error $e_k$ between the current observation and estimated observation;

$$V_k = \begin{bmatrix} \delta_k^2 & & \\ & \delta_k^2 & \\ & & \delta_k^2 \end{bmatrix},$$

where, $\delta_k = \delta_k^{var} + \delta_k^{mean}$, $\delta_k^{var} = \alpha\|d_k| - |d_{k-1}\| + (1-\alpha)\delta_{k-1}^{var}$, $$\delta_k^{mean} = \beta\left||d_k| + \frac{1}{|d_k|} - 2\right|,$$

$\alpha$ is a smoothing factor for an acceleration change, and $\beta$ is an impact factor for an acceleration module;

$$H_k = \left.\frac{\partial h}{\partial q}\right|_{q_k^-},$$

where, h is an observation function, $h(q,v) = q \cdot g + I_k$, g is the gravity vector of the world coordinate system, q is a state rotation, that is, a rotation from the world coordinate system to the gyroscope coordinate system; $I_k$ is a measurement noise;

$e_k = d_k \times h(q_k^-, 0);$

S1025, updating an optimal Kalman Gain Matrix $K_k$ at time k;

$K_k = P_k^- \cdot H_k^T (H_k \cdot P_k^- \cdot H_k^T + V_k)^{-1}$; and

S1026, updating the a posteriori estimation for a rotation $q_k^+$ from the portable terminal to the world coordinate system, and the a posteriori estimation for the process covariance matrix $p_k^+$ according to the optimal Kalman Gain Matrix $K_k$ and the Observation Error $e_k$;

$$q_k^+ = \exp([K_k \cdot e_k]_x) \cdot q_k^-,$$
$$P_k^+ = \exp([K_k \cdot e_k]_x) \cdot P_k^- \cdot \exp([K_k \cdot e_k]_x).$$

8. The non-transitory computer-readable medium of claim 7, wherein the step of acquiring, in real time, an accelerometer data of the gyroscope in the portable terminal, is:
reading 3-axis accelerometer data using a gravity sensor; and
the step of acquiring, in real time, an angular velocity of the gyroscope in the portable terminal, is: reading 3-axes angular velocities using an angular velocity sensor.

9. The non-transitory computer-readable medium of claim 7, after the step of acquiring, in real time, a current state timestamp, an accelerometer data and an angular velocity of a gyroscope in a portable terminal, further comprising a step of:
reducing noise from the accelerometer data using a low-pass filtering, which further comprises:
reducing noise from the accelerometer data using a low-pass filtering through Formula $d'_i = \alpha \cdot d_i + (1-\alpha) \cdot R_i \cdot d'_{i-1}$, where $d'_i$ represents the accelerometer data after low-pass filtering at time i, $d_i$ represents the accelerometer data at time i, and $R_i$ is a relative rotation of the i frame video of the gyroscope; $R_i = \exp[-\omega_i \cdot \Delta t]_x$, where $\omega_i$ represents the angular velocity at time i, $d'_{i-1}$ represents the accelerometer data after low-pass filtering at time i−1, and $\alpha$ represents a smoothing factor, $$\alpha = \frac{\Delta t}{Rc + \Delta t},$$
$$Rc = \frac{1}{2\pi f_c},$$

where $f_c$ represents a cut-off frequency for a low-pass filtering, Rc represents a time constant, and $\Delta t$ represents a sampling time interval of the gyroscope.

10. The non-transitory computer-readable medium of claim 7, wherein the step of synchronizing the timestamp of the gyroscope with a timestamp of a panoramic video frame, is:
synchronizing the timestamp of the gyroscope with the timestamp of a panoramic video frame, so that $t_k \geq t_j > t_{k-1}$, where $t_j$ is the timestamp of a panoramic video frame, $t_k$ is the timestamp of the K frame of the gyroscope, and $t_{k-1}$ is the timestamp of the K−1 frame of the gyroscope.

11. The non-transitory computer-readable medium of claim 10, wherein the step of performing quaternion interpolation in a rotation from the portable terminal to a world coordinate system to obtain a rotation matrix corresponding to the panoramic video frame, comprises steps of:
calculating a relative rotation of adjacent timestamps of the gyroscope, $r_k = q_k^+ q_{k-1}^{+}$, where, $r_k$ is a relative rotation at time k, $q_k^+$ and $q_{k-1}^+$ are respectively a posteriori estimation for the state rotation at time K and K−1, that is, the rotation from the world coordinate system to the gyroscope coordinate system;
performing quaternion interpolation to obtain a relative rotation from the panoramic video frame to the K frame of the gyroscope, $R_j = \gamma \cdot I + (1-\gamma) \cdot r_k$, where, $R_j$ is the relative rotation of the K frame, $$\gamma = \frac{t_j - t_{k-1}}{t_k - t_{k-1}};$$

and
calculating a rotation matrix of the j-frame video in the panoramic video frame, $Q_j = R_j^{-1} q_k^+$.

12. The non-transitory computer-readable medium of claim 11, wherein the step of rotating a panoramic image according to the current rotation matrix to generate a stable video frame, further comprises steps of:
mapping grid points on a 2D image with latitude and longitude to a spherical coordinate; and
traversing all points on a unit sphere, using the current rotation matrix to rotate all points on the unit sphere, and generate a stable video frame;
where, the step of using the current rotation matrix to rotate all points on the unit sphere, can use Formula:

$$\begin{bmatrix} x_{new} \\ y_{new} \\ z_{new} \end{bmatrix} = Q_j \begin{bmatrix} x \\ y \\ z \end{bmatrix} + t,$$

where $[x, y, z]^T$ represents the spherical coordinate before a unit circle rotates, $[x_{new}, y_{new}, z_{new}]^T$ represents the spherical coordinates after rotation, $Q_j$ represents the current rotation matrix, and t represents a displacement vector, $t=[0,0,0]^T$.

13. A portable terminal, comprising:
one or more processors;
a memory; and
one or more computer programs, wherein the one or more computer programs are stored in the memory and are configured to be executed by the one or more processors to perform steps comprising:
acquiring, in real time, a current state timestamp, an accelerometer data and an angular velocity of a gyroscope in a portable terminal;
estimating a rotation from the portable terminal to a world coordinate system using Extended Kalman Filtering combined with both the accelerometer data and the angular velocity;
synchronizing the timestamp of the gyroscope with a timestamp of a panoramic video frame;
performing quaternion interpolation in a rotation from the portable terminal to a world coordinate system to obtain a rotation matrix corresponding to the panoramic video frame; and
rotating a panoramic image according to the current rotation matrix to generate a stable video frame;
wherein, after the step of acquiring, in real time, a current state timestamp, an accelerometer data and an angular velocity of a gyroscope in a portable terminal, further comprising a step of:
reducing noise from the accelerometer data using a low-pass filtering, which further comprises:
reducing noise from the accelerometer data using a low-pass filtering through Formula $d'_i = \alpha \cdot d_i + (1-\alpha) \cdot R_i \cdot d'_{i-1}$, where $d'_i$ represents the accelerometer data after low-pass filtering at time i, $d_i$ represents the accelerometer data at time i, and $R_i$ is a relative rotation of the i frame video of the gyroscope; $R_i = \exp[-\omega_i \cdot \Delta t]_x$, where $\omega_i$ represents the angular velocity at time i, $d'_{i-1}$ represents the accelerometer data after low-pass filtering at time i-1, and $\alpha$ represents a smoothing factor, $$\alpha = \frac{\Delta t}{Rc + \Delta t},$$

$$Rc = \frac{1}{2\pi f_c},$$

where $f_c$ represents a cut-off frequency for a low-pass filtering, Rc represents a time constant, and $\Delta t$ represents a sampling time interval of the gyroscope.

14. The portable terminal of claim 13, wherein the step of acquiring, in real time, an accelerometer data of the gyroscope in the portable terminal, is: reading 3-axis accelerometer data using a gravity sensor; and
the step of acquiring, in real time, an angular velocity of the gyroscope in the portable terminal, is: reading 3-axes angular velocities using an angular velocity sensor.

15. The portable terminal of claim 13, wherein the step of estimating a rotation from the portable terminal to a world coordinate system using Extended Kalman Filtering combined with both the accelerometer data and the angular velocity, specifically comprises steps of:
S1021, calculating an initial-state rotation $q_0^+$ and an initial process covariance matrix $$P_0^+, q_0^+ = \exp\left[-\frac{d_0 \times g}{|d_0 \times g|} * acos(d_0 \cdot g)\right]_x,$$

where, $d_0$ is a measured initial accelerometer data, g is the gravity vector of the world coordinate system; an initial process covariance matrix $$P_0^+ = \begin{bmatrix} 25.0 & 0 & 0 \\ 0 & 25.0 & 0 \\ 0 & 0 & 25.0 \end{bmatrix};$$

S1022, calculating a State Transition Matrix $\Phi(\omega_k)$ at time K using the angular velocity $\omega_k$;
$\Phi(\omega_k) = \exp(-[\omega_k \cdot \Delta t]_x)$, where, $\omega_k$ is an angular velocity at time K, $\Delta t$ represents a sampling time interval of the gyroscope;
S1023, calculating a State Noise Covariance Matrix $Q_k$, updating an a priori estimate for a state rotation $q_k^-$ and an a priori estimate for a process covariance matrix $p_k^-$;

$$Q_k = \begin{bmatrix} \Delta t^2 & & \\ & \Delta t^2 & \\ & & \Delta t^2 \end{bmatrix},$$

where $Q_k$ is a State Noise Covariance Matrix;
$q_k^- = \Phi(\omega_k) * q_{k-1}^+$, where, $q_{k-1}^+$ is an a posteriori estimation for a state rotation at time K-1;
$P_k^- = q_k^- \cdot P_{k-1}^+ \cdot q_k^- + Q_k$, where, $P_{k-1}^+$ is an a posteriori estimation for a process covariance matrix at time K-1;
S1024, updating an Observation Noise Covariance Matrix $V_k$ from the accelerometer data $d_k$, calculating an Observation Transformation Jacobian Matrix $H_k$, and calculating an Observation Error $e_k$ between the current observation and estimated observation;

$$V_k = \begin{bmatrix} \delta_k^2 & & \\ & \delta_k^2 & \\ & & \delta_k^2 \end{bmatrix},$$

where, $\delta_k = \delta_k^{var} + \delta_k^{mean}$, $\delta_k^{var} = \alpha \|d_k\| - |d_{k-1}\| + (1-\alpha)\delta_{k-1}^{var}$, $$\delta_k^{mean} = \beta \left||d_k| + \frac{1}{|d_k|} - 2\right|,$$

$\alpha$ is a smoothing factor for an acceleration change, and $\beta$ is an impact factor for an acceleration module;

$$H_k = \frac{\partial h}{\partial q}\bigg|_{q_k^-},$$

where, h is an observation function, $h(q,v) = q \cdot g + I_k$, g is the gravity vector of the world coordinate system, q is a state rotation, that is, a rotation from the world coordinate system to the gyroscope coordinate system; $I_k$ is a measurement noise;

$e_k = d_k \times h(q_k^-, 0);$

S1025, updating an optimal Kalman Gain Matrix $K_k$ at time k;

$$K_k = P_k^- \cdot H_k^T (H_k \cdot P_k^- \cdot H_k^T + V_k)^{-1}; \text{ and}$$

S1026, updating the a posteriori estimation for a rotation $q_k^+$ from the portable terminal to the world coordinate system, and the a posteriori estimation for the process covariance matrix $p_k^+$ according to the optimal Kalman Gain Matrix $K_k$ and the Observation Error $e_k$;

$$q_k^+ = \exp([K_k \cdot e_k]_x) \cdot q_k^-,$$
$$P_k^+ = \exp([K_k \cdot e_k]_x) \cdot P_k^- \cdot \exp([K_k \cdot e_k]_x).$$

16. The portable terminal of claim 15, wherein the step of synchronizing the timestamp of the gyroscope with a timestamp of a panoramic video frame, is:
    synchronizing the timestamp of the gyroscope with the timestamp of a panoramic video frame, so that $t_k \geq t_j > t_{k-1}$, where $t_j$ is the timestamp of a panoramic video frame, $t_k$ is the timestamp of the K frame of the gyroscope, and $t_{k-1}$ is the timestamp of the K–1 frame of the gyroscope.

17. The portable terminal of claim 16, wherein the step of performing quaternion interpolation in a rotation from the portable terminal to a world coordinate system to obtain a rotation matrix corresponding to the panoramic video frame, comprises steps of:
    calculating a relative rotation of adjacent timestamps of the gyroscope, $r_k = q_k^+ q_{k-1}^{+}$, where, $r_k$ is a relative rotation at time K, $q_k^+$ and $q_{k-1}^+$ are respectively a posteriori estimation for the state rotation at time K and K–1, that is, the rotation from the world coordinate system to the gyroscope coordinate system;
    performing quaternion interpolation to obtain a relative rotation from the panoramic video frame to the K frame of the gyroscope, $R_j = \gamma \cdot I + (1-\gamma) \cdot r_k$, where, $R_j$ is the relative rotation of the K frame, $$\gamma = \frac{t_j - t_{k-1}}{t_k - t_{k-1}};$$

and
    calculating a rotation matrix of the j-frame video in the panoramic video frame, $Q_j = R_j^{-1} q_k^+$.

18. The portable terminal of claim 17, wherein the step of rotating a panoramic image according to the current rotation matrix to generate a stable video frame, further comprises steps of:
    mapping grid points on a 2D image with latitude and longitude to a spherical coordinate; and
    traversing all points on a unit sphere, using the current rotation matrix to rotate all points on the unit sphere, and generate a stable video frame;
where, the step of using the current rotation matrix to rotate all points on the unit sphere, can use Formula:

$$\begin{bmatrix} x_{new} \\ y_{new} \\ z_{new} \end{bmatrix} = Q_j \begin{bmatrix} x \\ y \\ z \end{bmatrix} + t,$$

where $[x, y, z]^T$ represents the spherical coordinate before a unit circle rotates, $[x_{new}, y_{new}, z_{new}]^T$ represents the spherical coordinates after rotation, $Q_j$ represents the current rotation matrix, and t represents a displacement vector, $t=[0,0,0]^T$.

* * * * *